US00RE41085E

(19) United States
(12) Reissued Patent
Anthonyson

(10) Patent Number: US RE41,085 E
(45) **Date of Reissued Patent: *Jan. 19, 2010**

(54) AUTOMATED VEHICLE PARKING SYSTEM FOR A PLURALITY OF REMOTE PARKING FACILITIES

(75) Inventor: Robert B. Anthonyson, Sunapee, NH (US)

(73) Assignee: TC (Bermuda) License, Ltd., Hamilton (BM)

( * ) Notice: This patent is subject to a terminal disclaimer.

(21) Appl. No.: 10/132,222

(22) Filed: Apr. 26, 2002

Related U.S. Patent Documents

Reissue of:
(64) Patent No.: 5,737,710
Issued: Apr. 7, 1998
Appl. No.: 08/554,849
Filed: Nov. 7, 1995

U.S. Applications:
(63) Continuation of application No. 09/545,298, filed on Apr. 6, 2000, now Pat. No. Re. 37,822.

(51) Int. Cl.
*G06F 17/40* (2006.01)
*G06F 19/00* (2006.01)

(52) U.S. Cl. ..... 701/1; 701/2; 701/117; 705/13; 340/928; 340/5.5; 340/5.7; 340/932.2; 235/378; 235/384

(58) Field of Classification Search ..... 701/1, 701/2, 117, 118, 119; 340/928, 932.2, 825.31, 340/5.5, 5.7, 825.33, 10.1, 10.52; 342/51, 342/69, 70, 53, 58; 705/13, 40, 41, 2
See application file for complete search history.

(56) References Cited

U.S. PATENT DOCUMENTS

| | | | | |
|---|---|---|---|---|
| 3,484,586 | A | 12/1969 | Wilson et al. | 235/61.6 |
| 3,604,898 | A | 9/1971 | Magnusson | 235/61.6 |
| 3,815,718 | A | 6/1974 | Singer | 194/1 N |
| 3,993,975 | A | 11/1976 | Long, Jr. et al. | 340/51 |
| 4,075,632 | A | 2/1978 | Baldwin et al. | 343/6.8 R |
| 4,207,468 | A | 6/1980 | Wilson | 250/341 |
| 4,360,810 | A | 11/1982 | Landt | 343/6.5 R |
| 4,587,410 | A | 5/1986 | Milnes | 235/382 |
| 4,603,390 | A | 7/1986 | Mehdipour et al. | 364/467 |
| 4,665,395 | A | 5/1987 | Van Ness | 340/825.31 |
| 4,739,328 | A | 4/1988 | Koelle et al. | 342/44 |
| 4,774,571 | A | 9/1988 | Mehdipour et al. | 358/108 |
| 4,782,345 | A | 11/1988 | Landt | 343/727 |
| 4,786,907 | A | 11/1988 | Koelle | 342/51 |
| 4,835,377 | A | 5/1989 | Brown | 235/492 |
| 4,876,540 | A | 10/1989 | Berthon et al. | 340/932.2 |
| 4,958,064 | A | 9/1990 | Kirkpatrick | 235/384 |
| 4,982,070 | A | 1/1991 | Bezin et al. | 235/378 |
| 5,003,520 | A | 3/1991 | Grieu et al. | 368/90 |
| 5,030,807 | A | 7/1991 | Landt et al. | 235/375 |
| 5,072,380 | A | 12/1991 | Randelman et al. | 364/406 |
| 5,086,389 | A | 2/1992 | Hassett et al. | 364/401 |

(Continued)

OTHER PUBLICATIONS

ACI Networks Parking Systems Software, Undated.

*Primary Examiner*—Tan Q Nguyen
(74) *Attorney, Agent, or Firm*—Caesar, Rivise, Bernstein, Cohen & Pokotilow, Ltd.

(57) ABSTRACT

An automated vehicle parking system for a plurality of remote parking facilities that communicates with a vehicle approaching or leaving the remote facility with RF signals, or the like, that identifies the vehicle and sends the vehicle identification number, time of day, and lane number to a first computer at the remote facility for calculating the parking cost of a given vehicle based on rates for said given individual vehicle stored in the first computer of each of the plurality of remote parking facilities and having a central computer coupled to each remote facility for providing a single bill to a user of several remote facilities and advising each remote facility first computer of the total fees due for all users of that remote facility during specified periods.

52 Claims, 3 Drawing Sheets

U.S. PATENT DOCUMENTS 5,311,186 A 5/1994 Utsu et al. ..... 342/51
5,339,000 A 8/1994 Bashan et al. ..... 340/932.2
5,414,624 A 5/1995 Anthonyson ..... 364/424.01
5,488,360 A 1/1996 Ray ..... 340/933
5,559,707 A 9/1996 DeLorme et al. ..... 364/443
5,602,375 A 2/1997 Sunahara et al. ..... 235/384
5,737,710 A * 4/1998 Anthonyson ..... 701/1

* cited by examiner

AUTOMATED VEHICLE PARKING SYSTEM FOR A PLURALITY OF REMOTE PARKING FACILITIES

Matter enclosed in heavy brackets [ ] appears in the original patent but forms no part of this reissue specification; matter printed in italics indicates the additions made by reissue.

*This application is a continuation reissue application of U.S. utility reissue application Ser. No. 09/545,298 U.S. Pat. No. RE37,822, filed Apr. 6, 2000, which is a reissue of U.S. Pat. No. 5,737,710, filed Nov. 7, 1995, issued Apr. 7, 1998.*

BACKGROUND OF THE INVENTION

1. Field of the Invention

The present invention relates in general to vehicle parking systems and in particular to a parking system having a central facility coupled to and monitoring a plurality of satellite parking facilities in which each satellite parking facility automatically identifies a vehicle approaching the entrance or exit lanes to the parking facility and generates an appropriate set of responses such as opening the gate, illuminating a fee display or other sign information, posting accounting information and the like. A user of multiple satellite parking facilities receives one statement periodically from the central or clearinghouse facility. Each satellite parking facility may be independent from the other satellite parking facilities and each may set its own charges and fee schedules. The central facility simply keeps track of all parking in all the satellite parking facilities and sends the user one bill (or debits an account) for the total amount of the parking. A key feature of the central facility or clearinghouse concept is the use of a prepaid balance as opposed to being billed in arrears. When the prepaid balance falls below a predetermined level, the clearinghouse or central facility will either debit the user's bank account via ACH (automated clearinghouse) or electronic funds transfer, charge the user's credit card account, or issue an invoice. If the balance becomes negative, the system generally will not allow the user to enter the garage.

2. Description of Related Art

There are many different types of semiautomatic parking systems for vehicles such as motor vehicles including monthly pass cards, automatic ticket dispensers, and the like. In systems where time accounting is required for parking that is subject to charge periods, a card having an electronic memory is used where each memory location can be individually and irreversibly written in order to represent a time unit credit allocated to the holder of the card. Other systems use an electronic memory and a card reader, a portable terminal carried by a parking checker, a card having a magnetic track containing a confidential identification number, and a label for sticking to the windshield of a vehicle with the label bearing information that is unambiguously related to the information stored in the card. Still other systems use capacitive cards and reader systems. Some systems use an automatic fee determining system including means to totalize the amount of coins accepted by the system. Such system includes means for calculating the fee due from a parking ticket. The customer then inserts coins into a coin receptor and a "vend" is produced only when the total value of coins at least equals the calculated fee due. Other systems have an entrance station for dispensing a coded card and initiating opening of an entrance gate and an exit station for receiving the card, sensing any lapsed time, computing a toll at a predetermined time rate, collecting the correct toll, and initiating opening of the gate in response to the collection.

These systems all require the intervention of a human operator or an interaction between the vehicle occupant and a device such as a ticket dispenser and the like.

In commonly assigned U.S. Pat. No. 5,414,624 there is disclosed an automatic parking system that can identify a vehicle approaching an entrance or exit lane, and then, based on that identity, generate an appropriate set of responses such as opening a gate, illuminating a fee display, posting accounting information, preparing periodic statements to the owner of the vehicle, and the like. However, if the user goes to another parking facility, either a new membership in that facility will be required so that the user receives another monthly billing statement or the user will have to pay cash.

While in its broadest state, the aforesaid patent claims cover a central billing operation, the improvement disclosed herein specifically covers the use of multiple parking facilities that feed a central billing/credit system thereby permitting the user to use facilities that may be independently owned but for which proper debit of the user's account will be made as well as proper credit attributed to the specific facility as determined in advance.

SUMMARY OF THE INVENTION

The present invention overcomes the disadvantages of the prior art by providing a parking system having a central facility coupled to and monitoring a plurality of satellite parking facilities and in which each satellite parking facility may be a facility that operates individually and independent of the other satellite parking facilities. The central facility simply monitors all of the satellite parking facilities and generates one monthly parking fee statement for each user (or a company account, if appropriate) of the system even if the user has parked in each of the satellite parking systems.

In the present system, a vehicle will pull into an entrance lane in any satellite parking facility until it can go no further because the entrance gate is closed. If the vehicle is equipped with a compatible tag or transponder, a signal will return from the vehicle to the sensor. The sensor then relays that signal to the lane controller. The lane controller is a circuit that processes that signal and couples it to a host computer with specific information regarding the vehicle such as the identifier ID, the date and time of day, lane number, and the like.

When the host computer receives the identification signal, it compares it to a complete list of recognized identification numbers contained in a database. If the identification number is found, additional information will then be known about the vehicle including the parker identification and the parking product such as monthly parker, debit, charge, and the like that pertain to this particular vehicle. That information is used to maintain a billing account for that identified vehicle. If the parker is authorized to use a product that allows entry such as daytime usage, weekend usage, or both, for example, then the system will treat the attempted entry as valid. The system will create a partial transaction record that includes the parker identification number, the parking product that is being used, the billing account, and the time of entry into the system. The system will also instruct the lane controller to open the gate. In addition, on a periodic basis, the satellite parking facilities may initiate the transfer of data, if necessary, to the central facility or clearinghouse by communicating with the computer in the central facility in any well-known manner such as by dialing through a modem. It is also feasible for the computer in the central facility to communicate with each of the satellite parking facilities and the host computer therein will download stored financial and related data as regarding each user of the facility. If the user has parked in plural facilities, the data from each facility relating to that user will be used to create a single billing statement. (If the billing is to a corporate or business account, multiple users may be tracked on a single billing statement.)

If the vehicle is not authorized to enter a parking facility because of no identification, no valid identification, not authorized to use a suitable product, or no credit in the account, and the like, the system will not permit entry. However, if the satellite facility also allows transient parkers, the vehicle operator can be issued a ticket in typical fashion which can be retrieved and the gate opened so that the vehicle can enter the satellite facility. This ticketed entry, however, will not be administered by the present system.

Alternatively, a parker who is not authorized to enter based on the present system may elect to pull a parking ticket to bypass the system.

As a vehicle approaches the exit lane, a detector, such as a loop detector, senses the vehicle's presence and notifies the exit lane controller. The exit lane controller activates a sensor to send a radio frequency signal to the vehicle. If the vehicle is equipped with a compatible tag or transponder, a signal will return from the vehicle to the sensor. The sensor then relays that signal to the lane controller processor. The lane controller processor again processes the signal and transmits it to the host computer along with specific information such as the vehicle identification number, the date and time of day, lane number, and the like.

When the host computer receives that information, it compares the vehicle identification number to the database that contains the complete list of recognized identification numbers. If that identification number is found, the partial transaction record is located and additional information will be known about the vehicle including when it entered the parking facility, the billing account, and the product that accounts for this visit. The system will then calculate the appropriate cost. This cost information and instructions to open the gate are then sent to the lane controller. The cost information is also posted to an accounts receivable submodule and is stored for relaying to the computer in the central facility when the satellite facility is polled.

In the normal case, the lane controller will display the parking cost on an appropriate display monitor and the gate will open. However, if the vehicle does not have an authorized identification number, the typical explanation is that the parker used a ticket on entry. This ticket will not be processed by the system but instead by a system for transient parkers that uses personnel at the gate to take the ticket, calculate a cost, and collect the parking fee.

Thus, it is an object of the present invention to provide an automated vehicle parking system in which a plurality of satellite parking facilities are coupled to a central facility for providing the user with a single billing statement regardless of the number of satellite facilities in which parking has occurred, and regardless of whether the satellite facilities are independently owned or operated.

It is also an object of the present invention to provide an automated vehicle parking system that senses a vehicle, transmits an interrogation signal to the vehicle and, if the vehicle has a compatible tag or transponder, receives from the vehicle an identification number for use in system computers for calculating costs for that particular vehicle and further storing those costs to be passed to the computer in the central facility when polled.

It is also an object of the present invention to provide an automated parking facility in which the gates are opened and closed according to a common transponder signal received from the vehicle when interrogated regardless of the particular one of a number of predetermined satellite parking facilities that have been used.

It is still another object of the present invention to provide an automated vehicle parking system in which various parking products such as by the hour, by the day, monthly parkers, daytime only, weekend only, and the like can be applied to a particular vehicle, and the costs automatically calculated on a real time basis and stored in an accounting system from which they can be transferred to a computer in a central facility that will issue periodic billings to the customer owning the vehicle regardless of the number of satellite systems used by the vehicle owner, and the central facility will also issue periodic accountings and credits to each facility operator.

BRIEF DESCRIPTION OF THE DRAWINGS

These and other objects of the invention will be more fully understood when taken in conjunction with the following DETAILED DESCRIPTION OF THE PRESENT INVENTION in which like numerals represent like elements and in which.

DETAILED DESCRIPTION OF THE PRESENT INVENTION

Figure 1:
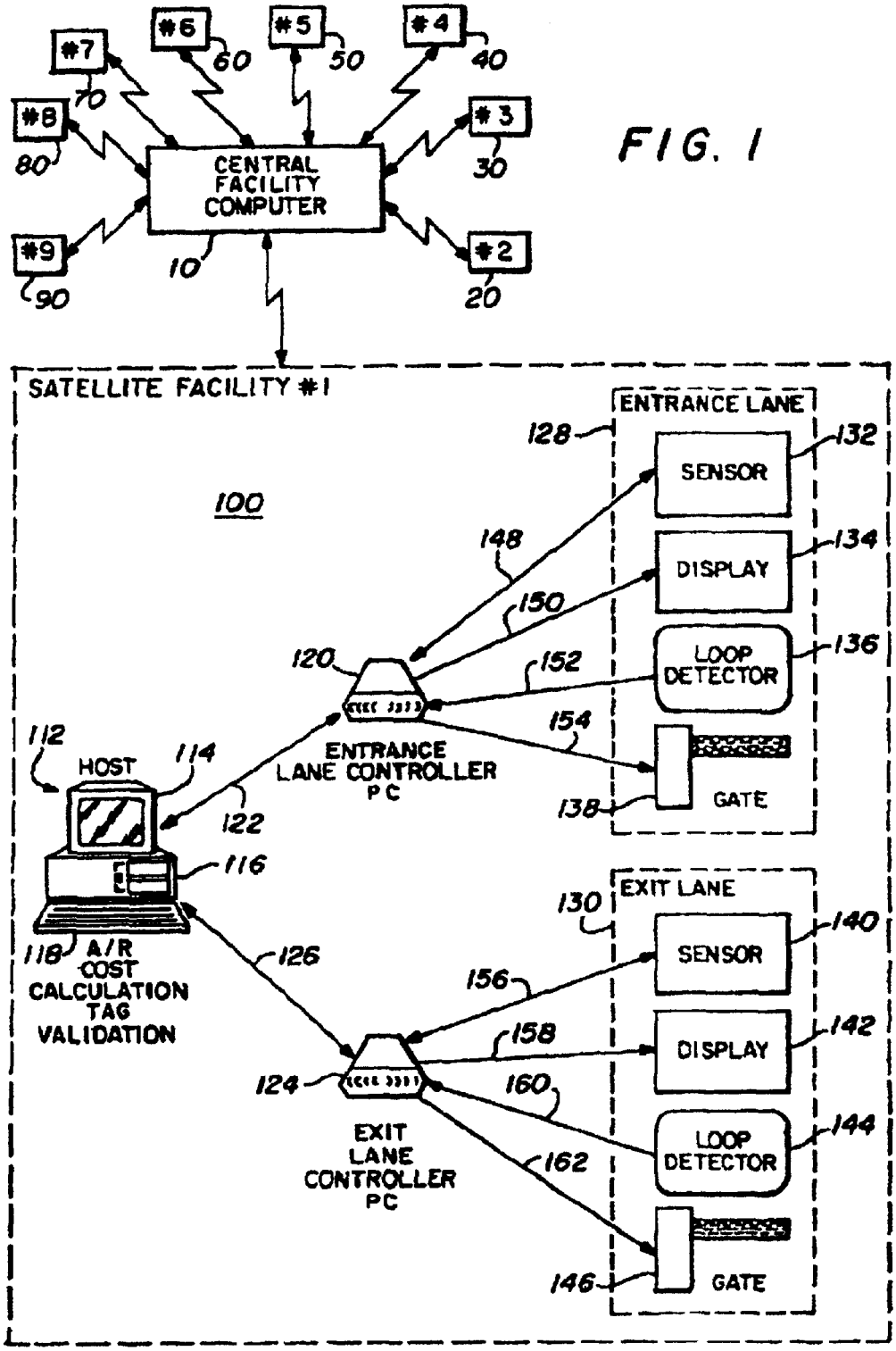
FIG. 1 is a general system overview diagram illustrating the detailed operation of one of the satellite parking facilities.

FIG. 1 is a block diagram illustrating the general system overview including a central facility computer 10 and nine satellite parking facilities 20, 30, 40, 50, 60, 70, 80, 90, and 100. The details of one of the satellite parking facilities 100 is shown and includes the host computer 112 that accomplishes the accounting, cost calculations, tag validation, and the like. The host computer 112 comprises a display screen 114, a computer 116, and a keyboard or other entry device 118 such as a mouse. The host computer 112 communicates with both the entrance lane controller computer 120 and the exit lane controller computer 124 through lines 122 and 126, respectively. Further, when polled by the central facility computer 10, all data regarding a user will be transferred to the central facilities computer 10. The entrance lane controller is coupled to an entrance lane module 128 that includes a sensor 132, a display 134, a detector 136, such as a loop detector, and an entrance gate 138. In like manner, the exit lane controller communicates with an exit lane module 130, that, again, includes a sensor 140, a display 142, a detector 144, which again may be a loop detector, and an exit gate 146.

The sensor 132, 140 in both the entrance lane module 128 and the exit lane module 130 may be a sensor of the type disclosed in U.S. Pat No. 5,030,807. It is an interrogator that sends a signal such as an RF signal to a remote transponder or tag, the signal including data intended to be received and/ or stored in the tag. The tag or transponder modulates the received signal with data temporarily and/or permanently stored in the tag including data indicating the identity of the object to which the tag is attached. The sensors 132 and 140 have the capability of recognizing the identity of the tagged object from the returned signal. Displays 134 and 142 are typical image displays such as a television set, an LCD display, or LED's, for example. The detectors 136 and 144 are a mini-type of detector, such as a loop detector, that can sense the approach of a vehicle. Gates 138 and 146 are typically electrically controlled gates that can respond to a signal from the lane controllers 120, 124 to open the gates as signalled.

Thus the system uses off-the-shelf automatic vehicle identification equipment for access and revenue control.

As a vehicle approaches the entrance lane to any satellite parking facility, gate 138 is closed. At this point, loop detector 136 senses the presence of the vehicle and notifies the entrance lane controller computer 120. The lane controller computer 120 activates sensor 132 through line 148 and causes sensor 132 to send a radio frequency signal to the vehicle. If the vehicle is equipped with a compatible automatic vehicle identifier tag or transponder, it will recognize the signal at any one of the satellite parking systems and will return an identifying signal from the vehicle to the sensor 132. The sensor 132 then relays that signal to the lane controller computer 120. The lane controller computer 120 processes the signal by removing duplicates and the like and passes the signal on to the host computer 112 along with specific information such as the vehicle identification number, date and time of day, and the lane number.

Figure 2:
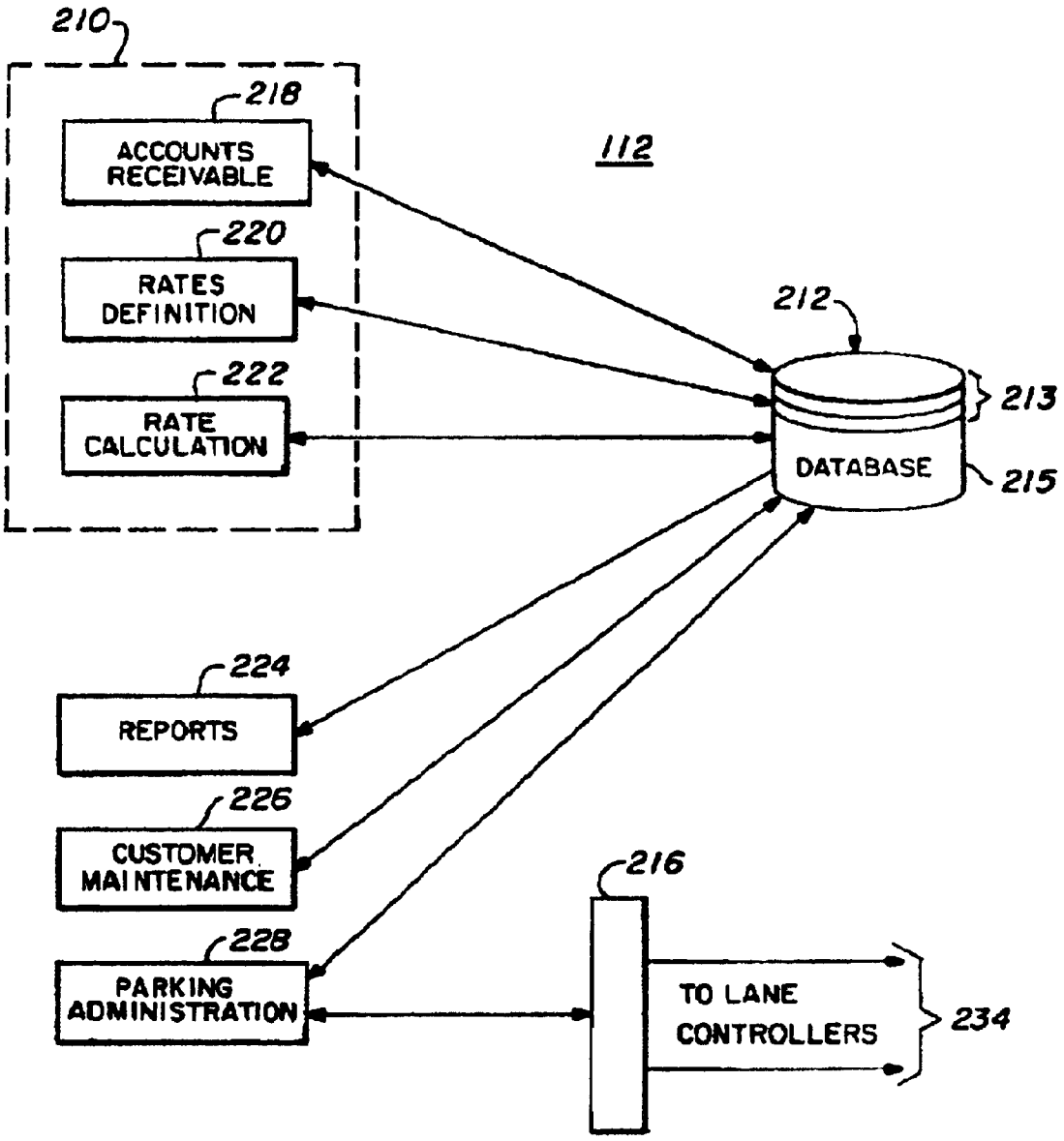
FIG. 2 is a diagrammatic representation of the host computer used in a satellite parking facility and its functions.

When the host computer 112 receives that information, it compares the vehicle identification number to a complete list of recognized identification numbers contained in database 215 (shown in FIG. 2). If the identification number is found, then additional information will be known about the vehicle including the parker identification and the parking product such as monthly, day, debit, charge, and the like. It also will know the billing account against which the parking activity should be charged. If an authorized vehicle ID is found, then it is determined if that vehicle has an authorized parking product. If it has, the system computer 112 will treat the attempted entry as valid. The system host 112 will create a partial transaction record that includes the parker identification number, the parking product being used, the billing account, and the time of day. The system host computer 112 will also instruct the lane controller 120 to open the gate 138.

If the would-be-parker is properly authorized, the gate 138 will have opened and the parker can drive through the gate. If the parker is not authorized, for example, has no identification number, no valid identification number, insufficient credit in account, is not authorized to use an available or suitable product, and the like, the system will not permit entry. However, if the parking facility allows transient parkers, the parker can pull a ticket and enter the facility. However, this type of entry will not be administered by the present invention. Of course, a parker who is authorized to enter based on the present system may elect to pull a ticket to bypass the system if it is so desired.

The exit lane functions in a manner similar to the entrance lane. As the vehicle approaches the exit lane, the gate 146 is closed. At this point, the detector 144 which, again, may be a loop detector, senses the presence of the vehicle and signals the exit lane controller computer 124 on line 160. The lane controller 124 activates the sensor 140 on line 156 and causes it to send a radio frequency signal towards the vehicle. Again, if the vehicle is equipped with a compatible vehicle identifier tag or transponder, the signal will return from the vehicle to the sensor 140. The sensor 140 then relays that signal to the lane controller computer 124 on line 156. The lane controller computer 124 processes the signal and, again, passes it on to the host computer 112 along with the specific information such as the vehicle identifier number, date, time of day, and lane number. When the host computer 112 receives the vehicle identification number, it compares it to the database 215 (FIG. 2) that contains a complete list of recognized identification numbers. If the identification number is found, a partial transaction record can be located in the database and additional information will be known about the vehicle including the time it entered, the billing account, the parking product associated with that account, and the like. The system 112 will then calculate the appropriate costs. This cost information and instructions to open the gate 146 will be sent to the lane controller 124 on line 126. This cost information will also be posted to an accounting system 210 (FIG. 2) and will be available for transfer to the central facility computer 10 at appropriate times.

Again, the lane controller computer 124 will cause the parking cost to be shown on display on 142 and the gate 146 will open. However, if the vehicle does not have an authorized identification number, it is presumed that the parker pulled a ticket on entry. This ticket will not be processed by the system but instead by a system for transient parkers that uses personnel such as cashiers at the gate to take the ticket, calculate a cost, and collect a parking fee. The host computer 112 will typically be a computer such as a 486/33 (or higher) running OS/2™ or other operating system, a keyboard, a mouse, and including a VGA monitor. It will typically be installed in the parking office. The lane controller computers will typically be 386/33 computers (or higher) with storage devices such as hard disk drives but without keyboards, monitors, or floppy drives. These computers may be installed near the lanes.

FIG. 2 is a block diagram of the details of the host computer 112. This computer includes an accounting system 210 and data storage 212 that include a well-known Btrieve™ 213 database or other database manager or file system. It also includes a communications board 216 coupled to the lane controllers at line 234. The host computer 112 may also include a report submodule 224, a customer maintenance submodule 226, and a parking administration submodule 228. The host computer 112 will provide the lane controller computers 120 and 124 with a list of recognized tag or transponder ID numbers for use in an emergency condition only. In addition, a status code may supplement each recognized tag or transponder number so that the lane computers 120 and 124 can take the appropriate actions. There are several possible actions that can take place when a vehicle with a tag enters a lane. Some specialized actions are appropriate only at certain modules within the system. The description of each module will detail such specialized action. Thus the host computer 112 will provide standard actions such as recognizing the tag, providing the signal for opening the gate or changing and returning the tag status such as: tag not recognized, do not open gate; tag recognized, do not open gate, improper status received; tag recognized, do not open gate, deactivated tag; and tag recognized, do not open gate, stolen tag. These actions may also initiate various alarms, visual or otherwise, in the lane and in the parking facility office. A customer or user with a tag or transponder will not have the opportunity to override the tag or transponder other than by physically removing it, turning it off, or pulling a ticket at the time of entry.

Moreover, the lane computers 120 and 124 will transmit information about each attempted entrance or exit to the host computer through the lane controller interface 214. This information will include, for example only, a 26 character alphanumeric tag identifier, lane number, date, time of day, and action taken. The host computer 112 will then create a transaction record from the previous information to which it will add the name of the facility.

In addition, it could also add the name of the tag holder, the billing account, and the like and make all such stored data available to the central facility computer 10 at appropriate times.

Off-the-shelf tags or transponders provide for at least 26 characters of information on each tag since there will be an all-out attempt to have tag compatibility between regional toll-roads, bridges, tunnels, and multiple parking facilities. Most of the information will be for vehicle identification only. The tag will typically not contain any information that would associate it with a particular parking facility.

The host computer 112 provides a proper interface with the lane controllers through parking administration submodule 228. The programs in such submodule 228 allows the operators to turn off lanes, control gates, initiate batch posting of invoices, activate displays, and other administrative functions. In addition, accounting module 210 includes the accounts receivable submodule 218, a rates definition submodule 220, and the rate calculation submodule 222. The accounts receivable submodule 218 receives and posts the costs involved in each parking transaction. This submodule will generate periodic statements, such as on a monthly basis, and track the accounts receivable history.

The rates definition submodule 220 enables parking rates that are entered into the system to be modified as necessary. It allows the most complex rates to be easily input and changed. Moreover, the submodule 220 retains a history of all rates that were ever used and the system allows upcoming rates to be defined for any time in the future.

The rate calculation submodule 222 identifies the proper billing account and parking product to be identified for each parking visit. Then, at exit, the proper cost is calculated by the rate calculation submodule 222.

In addition, a report module 224 is provided. This submodule provides a large set of standard reports. These reports show parking activity by time of day, length of stay, cost, and the like. This module also allows the easy creation of additional reports by the parking operator.

The customer maintenance submodule 226 receives input information from the operator about the customer such as address, billing information, and vehicle information.

All of these submodules and the information contained therein are utilized by an algorithm in the host computer 112 to calculate the parking cost for each tag identified customer. The rate schedules, as defined in submodule 220, have a name, a grace period, and an ordered list of conditions and associated rate tables. The conditions define under what circumstances a rate table is applied. More than one rate table may be used in the calculation of the cost of a single garage entrance and exit. The conditions retained in the rates definition submodule 220 include entrance time interval such as, for example 6:00 a.m. to 8:00 a.m., and exit time interval which specifies the time of exit from the garage and the exit must occur in the specified interval, the duration interval that requires a length of stay that is between the minimum and maximum amounts of time set, the days of the week for the which the rates tables are valid, usually either Monday through Friday or Saturday and Sunday. The valid day of the week may be specified as a date rather than a specific day of the week. A calendar of holidays may be specified as part of the maintenance of the system. Further, an exit time limit and duration limit can also be stored in the rates definition module. A duration limit is a period of time used to limit application of the rate table for the condition. The duration limit is not used to determine if the condition is satisfied. The duration limit is used to limit the duration for which the rate table is applied. Thus, the first half hour of parking may be at a first rate, the second half hour at a second rate, the next two hours at a third rate and any additional hours at a fourth rate.

A rate table is associated with each condition by specifying its name. A discount rate may also be associated with the rate table for this condition. This allows selected discounts to be easily applied for selected classes of accounts. The algorithm for applying the rate table is used to search the ordered list of conditions for the first condition which is satisfied and then adding the rate calculated from the rate table associated with the condition. The entrance time is then updated using the maximum duration as specified earlier. If the remaining duration is less than the grace period, the rate calculation is finished otherwise the limit of conditions is searched again from the beginning. The rate table consists of a list of rates specified such as period, repeat, and rate. The period designates the period for which to apply the rate, for example a one-half hour interval. The repeat allows a number of periods over which to use the rate, for example, the rate is to be used for the next 3½ hours. Finally the specified rate table establishes the rate for each of the periods. To calculate the total rate, the first rate is applied for the first repeat number of periods. Then the second rate is applied for the second repeat number of periods. As many of the rates are used as needed to calculate the rate for the entire duration. The actual calculation, of course, takes place in the rate calculation submodule 222.

Figure 3:
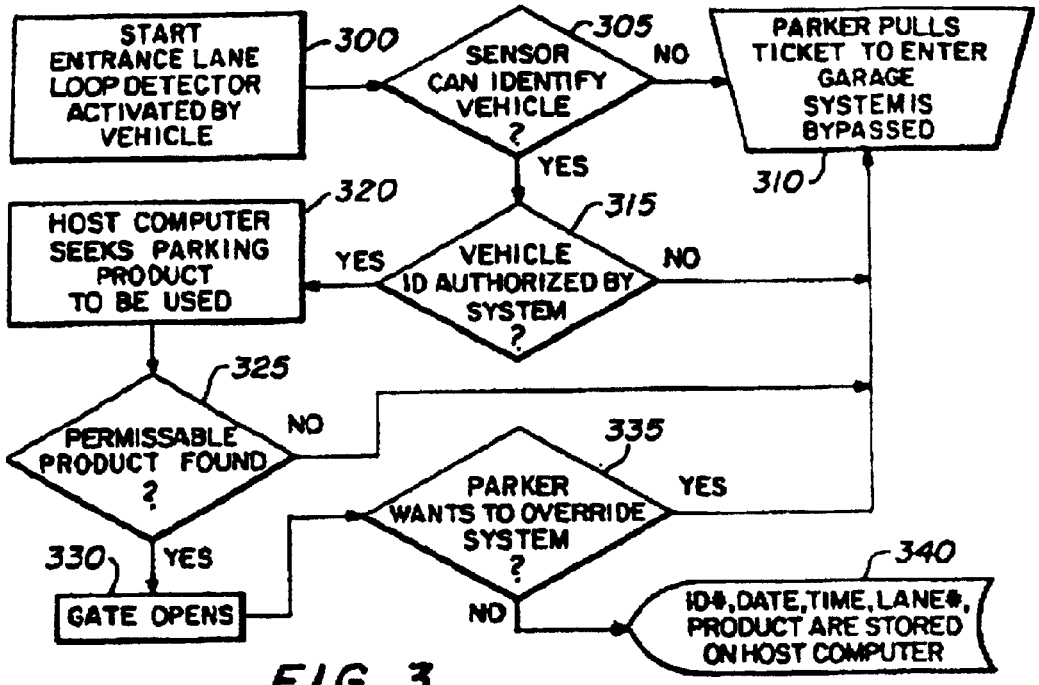
FIG. 3 is a flow chart illustrating the operation of a satellite parking facility as a vehicle approaches the entrance of the lane.

FIG. 3 is a flow chart illustrating the operation of the system as a vehicle approaches the entrance lane. At block 300, the loop detector 136 in the entrance lane is activated and detects the vehicle and transmits that signal to the entrance lane controller computer 120. At block 305 the automatic vehicle identification sensor 132 has transmitted an RF signal to the vehicle and from the return, or lack of return, of signal from the vehicle, a decision is made as to whether the sensor 132 can identify the vehicle. If not, the parker, at block 310, pulls a ticket to enter the garage and the present invention system is bypassed.

If the sensor 132 can identify the vehicle, then a decision is made at block 315 by the entrance lane controller computer 120 as to whether the vehicle identification number is authorized by the system. If not, again the parker must pull a ticket, as indicated by block 310, to enter the garage and the automatic vehicle identification system is bypassed. If yes, the host computer 112 at block 320 seeks the parking product that is to be used with this particular vehicle. That information is stored, as stated earlier, in the database 215 of the host computer 112. At block 325 a decision is made by host computer 112 as to whether a permissible product is found in the database 215. If not, again the parker would have to pull a ticket, as indicated at the block 310, to enter the garage and the system would be bypassed. If a permissible product is found by host computer 112, the gate opens as indicated at block 330. At block 335, if the parker wants to override the present system, he simply pulls a ticket to enter the garage. If the parker is using the system, at step 340, the vehicle identification number, date, time, lane number, and product are stored in the host computer 112 where the calculations take place as described earlier.

Figure 4:
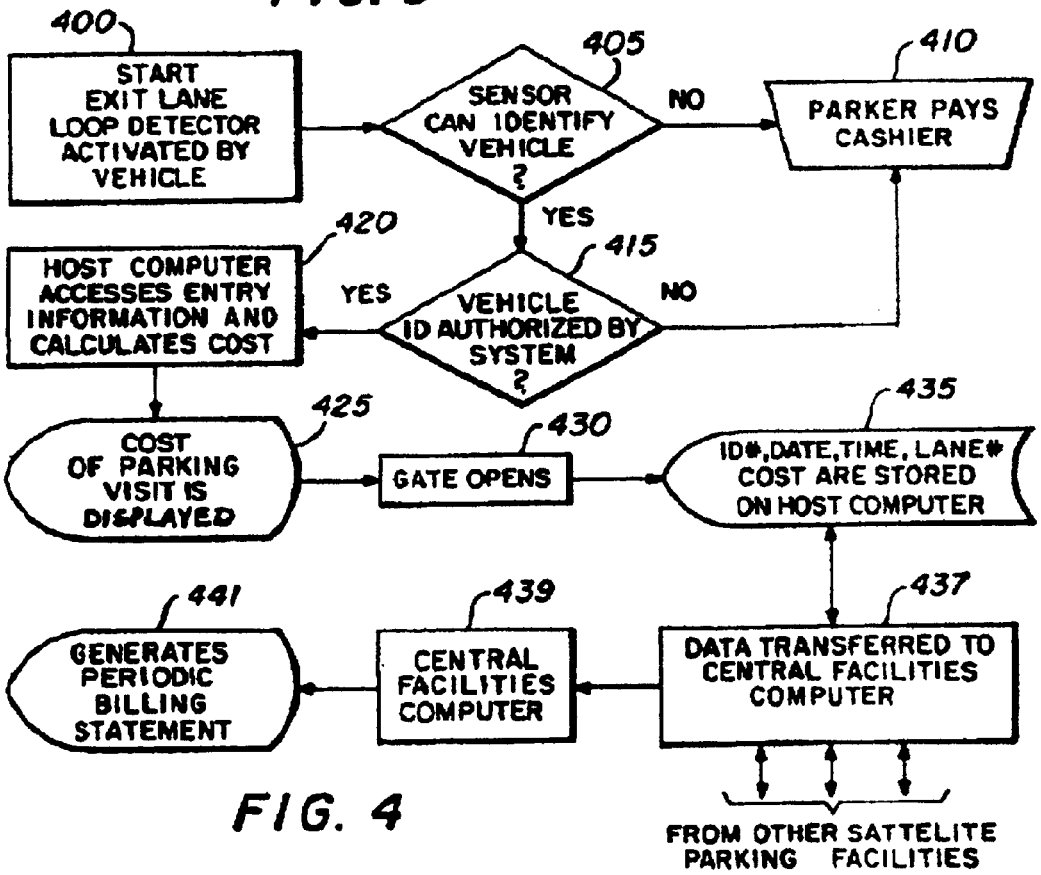
FIG. 4 is a flow chart illustrating the operation of the satellite parking facility as a vehicle approaches the exit lane.

FIG. 4 discloses the system process when a vehicle is operating in the exit lane. At block 400, the exit lane loop detector 144 detects an approaching vehicle and transmits the detection signal to the exit lane controller computer 124. At block 405, the sensor 140 decides whether it can identify the vehicle. If not, the parker has to pay the cashier as indicated at block 410. If the vehicle is identified, a decision is made as indicated at block 415 to see if the vehicle ID is authorized by the system. If not, again, the parker pays the cashier at block 410. If the vehicle is authorized, then, as indicated at block 420, the host computer 112 accesses the entry information stored in database 215 and calculates the cost with accounting system 210. Block 425 indicates that the cost of the parking visit is displayed and, as indicated, at block 430, the gate 146 opens. As indicated, at block 435, the identification number, date, time, lane number, and cost are stored in the host computer database 215.

At block 437, the data stored in the host computer database at step 435 may be transferred to the central facilities computer at step 437 upon appropriate communications being established. As indicated by the arrows entering step 437, all of the satellite systems may be in communication with the central facilities computer 10 shown at step 439. At step 441, the central facilities computer 10 may generate periodic consolidated billing statements for each customer using one or more of the satellite parking facilities, as well as statements for each of the independent satellite facilities.

Thus, there has been disclosed a novel automated parking system which enables a user to enter and leave one of a plurality of parking facilities in a unified system at any specified time with the use of a sensor at the appropriate gate and a tag or transponder on the vehicle that can communicate with the sensor. When a vehicle is detected, the sensor is activated to transmit an interrogation signal, such as an RF signal, toward the vehicle. If the vehicle does not have a tag, the operator of the vehicle can bypass the system by pulling a ticket. If the tag is valid, the gate automatically opens, the vehicle enters and the time of day, the lane number, and vehicle identification number are stored in a host computer. When the vehicle leaves the parking facility, again the vehicle is detected by a loop detector, the sensor is activated to transmit the interrogation signal, the tag on the vehicle responds, and the information is transmitted to the host computer which then calculates the cost of the parking and stores it in an accounting system module such that billing statements can be prepared at a later date. The rate schedule can vary for monthly parkers, duration intervals, days of the week, and duration limits. The rates can be defined however the parking facility desires. Reports are generated as needed on a daily, weekly, or monthly basis and an accurate record is kept for each user of the parking facility. These reports may be transferred to a central computer facility as appropriate so that the central computer may issue a consolidated billing statement for each user and each satellite facility, if desired. Clearly, the data stored at the satellite parking system could simply be time of entry and time of departure to and from the facility as well as the type of parker. The central computer could then store the rates for each parking facility and could calculate the fee at the central computer facility where the consolidated report is generated. If a central billing service is used, the user will be billed appropriately and the central facility may reimburse or credit each remote or satellite facility with its appropriate fee.

In summary, with the present invention, a fee calculation system is disclosed that is hands-free (automatic) and time-varied (time dependent) and unilocational (at one particular location). A vehicle reaches a location and is charged a fee based on time-of-day and/or day-of-week. Fee may also vary by particular vehicle (allowing for high occupancy vehicles, volume discounts, et cetera). The entire transaction requires no interaction on the part of the driver or any other vehicle occupant; the process is hands-free and is accomplished through the "automatic" identification of the vehicle. The fee calculation is independent of the fee collection that can take place either before (in the case of debit accounts), after (in the case of charge accounts), or at the time of fee calculation. The fee data may be transferred to a central computer that generates a consolidated billing statement for each user (individual or corporate) of one or more satellite parking facilities and each of the remote or satellite parking facilities appropriately credited or advised of its share of fees due from individual users.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

I claim:

[1. An automated vehicle parking system for access and revenue control of a plurality of remote parking facilities, each facility having controlled entrance lanes and controlled exit lanes, the system including:

a vehicle detection device with each of the remote parking facilities for detecting a vehicle as the vehicle approaches the facility entrance lane;

a lane controller system with each of the remote parking facilities coupled to the vehicle detection device for identifying the vehicle and generating a recognition signal;

a computer database with each of the remote parking facilities for storing parking information concerning all vehicles that use the automated system;

a first computer associated with each of the remote parking facilities and coupled to the lane controller and the database for receiving the recognition signal and generating appropriate parking response signals from the database to the lane controller system, said first computer calculating a parking fee for each vehicle;

a central facility; and a communication system including a second computer in said central facility coupled to the first computer to enable the second computer to communicate with said first computer at each of the remote parking facilities and to periodically calculate a single parking fee statement for a given vehicle whether parked at one or more of the plurality of remote parking facilities and to advise each remote facility first computer of the total fees due to that remote facility for each vehicle during specified periods.]

[2. An automated vehicle parking system as in claim 1 wherein the vehicle detection device at each remote parking facility includes a magnetic loop detector that detects an approaching vehicle and identifies the lane number of the vehicle.]

[3. An automated vehicle parking system as in claim 1 wherein the lane controller system at each remote parking facility includes:

a sensor for transmitting an interrogation signal to the approaching vehicle;

a tag associated with the vehicle for receiving the transmitted signal and returning a vehicle identification signal to the sensor; and a lane controller processor coupled to the sensor and the vehicle detection device, said lane controller processor activating the sensor upon receipt of a signal representing a detected vehicle, receiving the vehicle identification number from the sensor, and passing the valid vehicle identification number, the lane number, and the time of day to the first computer.]

[4. An automated parking system as in claim 3 wherein the first computer database at each remote parking facility includes data representing:

status of each vehicle tag identification number;

rate schedule for each vehicle tag identification;

entrance time and date;

exit time and date;

parking duration interval;

maximum and minimum parking duration intervals;

parking facility identification; and home parking facility identification.]

[5. An automated vehicle parking system as in claim 4 further comprising an accounting module associated with each of the remote parking facilities and coupled to the first computer and database, the accounting module including:

an accounts receivable submodule for each of the vehicle tags for storing costs and generating periodic billing statements for parking of each identified vehicle;

a rates definition table submodule for defining parameters for a rate calculation algorithm including parking rates for each identified vehicle; and a rate calculation submodule identifying rate schedules for each vehicle transponder account and calculating costs with the rate calculation algorithm based upon appropriate rates and parking times.]

[6. An automated vehicle parking system as in claim 5 further including:

a data report module at each remote parking facility for generating reports showing parking activity by time of day, length of stay, cost, and the like;

a customer maintenance file at each remote parking facility including address, billing information, and vehicle information; and a parking administration submodule at each remote parking facility for transmitting appropriate parking response signals to the lane controller modules for deactivating lanes, displaying cost, printing invoices, and the like.]

[7. An automated vehicle parking system as in claim 1 wherein said second computer credits each remote parking facility with its appropriate fees for parker use thereof.]

[8. An automated vehicle parking system as in claim 1 wherein said second computer advises each remote parking facility of its share of fees due from individual users.]

[9. An automated vehicle parking system including a plurality of remote parking facilities each of which has an entrance and an exit, the system including:

a vehicle detector at each remote parking facility for generating a detector signal when a vehicle approaches the entrance to the facility;

a lane controller coupled to the detector at each remote parking facility for receiving the detector signal and generating an identification request signal;

a sensor at the entrance of each remote parking facility and coupled to the lane controller for transmitting the identification request as an RF signal to the detected vehicle;

a transponder in the vehicle for responding to the transmitted sensor identification request signal by returning an identification code to the sensor;

said lane controller receiving the identification code from the sensor, generating the time of day, and a signal representing the lane number;

a first computer at each remote parking facility that is coupled to the lane controller for receiving the vehicle identification code, the time of day, and lane number and generating an appropriate response to the lane controller, the lane controller automatically admitting the vehicle to the parking facility, or denying the vehicle admittance in accordance with the response from the first computer, said first computer calculating a parking fee for each vehicle using the facility; and a second centralized computer coupled to the first computer at each of the remote parking facilities for communicating with each of the first computers and preparing a single periodic parking fee statement for each vehicle that uses one or more of the remote parking facilities.]

[10. An automatic vehicle parking system as in claim 9 wherein said second computer credits each remote parking facility with its appropriate fees for parker use thereof.]

[11. An automatic vehicle parking system as in claim 9 wherein said second computer advises each remote parking facility of its share of fees due from individual users.]

[12. A method for access and revenue control of a plurality of remote parking facilities, each having at least one controlled entrance lane and at least one controlled exit lane, the method comprising the steps of:

generating a vehicle detection signal at each of the plurality of remote parking facilities with a detection device when a vehicle approaches the remote parking facility entrance;

identifying vehicles authorized to use the remote parking facility with a lane controller system and generating an authorization signal;

storing parking information in a first computer database concerning the vehicles authorized to the use the remote parking facility;

generating appropriate parking responses to the lane controller system upon receiving the authorization signal; and communicating with the database of the first computer in each of the remote parking facilities with a central computer and compiling a single parking fee statement with the central computer for a user of one or more of the remote parking facilities.]

[13. A method as in claim 12 further comprising the step of detecting an approaching vehicle at each of the remote parking facilities and identifying the lane number of the vehicle with a magnetic loop detector.]

[14. A method as in claim 13 further comprising the steps of:

coupling a sensor to the vehicle detection system for transmitting an interrogation signal to the approaching vehicle;

associating a transponder with the vehicle for receiving the transmitted signal and returning a vehicle identification signal to the sensor; and storing data representing current vehicle transponder identification signals and time of day in a lane controller processor and passing the vehicle identification number, the lane number, and the time of day to the first computer.]

[15. The method as in claim 14 further comprising the step of using said central computer to advise each remote facility computer of the total fees due the corresponding remote facility for all users of the respective remote facility during specified periods.]

*16. In an automated vehicle parking system for access and revenue control of a plurality of remote parking facilities, a method comprising:*

*receiving parking information from a first remote parking facility, wherein the*

*parking information includes an identification of each user of the first parking facility or the user's vehicle;*

*receiving parking information from a second remote parking facility, wherein the parking information includes an identification of each user of the second parking facility or the user's vehicle; and*

*compiling and creating combined parking fee statements using a computer based on the received parking information from the first and second parking facilities.*

*17. The method of claim 16 wherein the received parking information from the first and second remote parking facilities includes a vehicle identification signal for a vehicle tag transponder associated with each vehicle and wherein the vehicle transponder is interrogated to receive the vehicle identification signal.*

*18. The method of claim 16 wherein the first and second remote parking facilities are owned by respective first and second entities, and wherein the method includes providing separated statements to the first and second entities.*

*19. A system for payment at a plurality of remote parking facilities, the system comprising:*

*a computer database at each of the remote parking facilities for storing parking information concerning users of the system;*

*a first computer associated with each of the remote parking facilities and coupled to the computer database, said first computer calculating a parking fee for said users;*

*a central facility; and*

*a second computer in said central facility for communicating with the first computer at each of the remote parking facilities and for periodically generating a single parking fee statement for a given user account whether used at one or more of the plurality of remote parking facilities.*

*20. The system of claim 19, further comprising:*

*an exit gate; and*

*a sensor at the exit gate for transmitting an interrogation signal to a tag associated with a user account.*

*21. The system of claim 20, wherein the tag sends a user account identification signal to the sensor.*

*22. The system of claim 21, wherein:*

*the first computer generates a parking response signal authorizing the exit gate to open upon receipt of a valid user account identification from the sensor.*

*23. A method for payment at a plurality of remote parking facilities comprising the steps of:*

*storing in a first computer database parking information concerning users of a particular parking facility;*

*calculating a parking fee for a user's vehicle using the particular parking facility; and*

*communicating the parking information and the calculated parking fees to a central computer, the central computer receiving parking information and calculated parking fees from said plurality of remote parking facilities, and generating a single parking fee statement for a user account used at one or more of the remote parking facilities.*

*24. The method of claim 23, further comprising:*

*detecting a transponder identification signal; and*

*generating a parking response signal to open an exit gate when the transponder identification is valid.*

*25. The method of claim 23, further comprising:*

*detecting a transponder identification signal; and*

*generating a parking response signal to open an entrance gate when the transponder identification is valid.*

*26. A system for payment at a plurality of remote parking facilities, one of the plurality of remote parking facilities having a system comprising:*

*a computer database for storing information concerning users of the remote parking facility;*

*a first computer associated with the remote parking facility and coupled to the database for generating response signals from the database, the first computer calculating a parking fee for a user of the remote parking facility; and*

*wherein the first computer is coupled to and provides the parking fee to a central computer, wherein the central computer, in response thereto, periodically generates a single fee statement for a given user account.*

*27. The system of claim 26, further comprising:*

*an exit gate; and*

*a sensor for transmitting an interrogation signal to a tag associated with the given user account when the tag is at the gate.*

*28. The system of claim 27, wherein the tag sends a user account identification signal to the sensor, and wherein the first computer generates a parking response signal authorizing the exit gate to open upon receipt of a valid user account identification from the sensor.*

*29. In a system for payment at a plurality of remote locations, a system comprising:*

*a computer database for storing information concerning tags used with the payment system;*

*a first computer associated with the remote location and coupled to the database for generating response signals from the database, the first computer calculating a parking fee for at least one of said tags; and*

*wherein the first computer is coupled to and provides the parking fee to a central computer, wherein the central computer in response thereto, periodically generates a single fee statement corresponding to a given tag whether used at one or more of the plurality of remote parking facilities.*

*30. A method for payment at a plurality of remote parking facilities, comprising the steps of:*

*receiving parking information from a remote computer at each of the plurality of remote parking facilities, wherein the parking information concerns and identifies tags used at a remote parking facility; and*

*generating a single parking fee statement for a user account used at one or more of the plurality of remote parking facilities based on the received parking information.*

*31. The method of claim 30, wherein said step of receiving parking information comprises receiving a tag identification signal; and*

*wherein the method further comprises storing data representing current tag identification signals, time of day, day of week and lane number.*

*32. The method of claim 31, further comprising:*

*advising each remote facility computer of the total fees due the corresponding remote facility for users of the respective remote facility during specified periods.*

*33. In a system for payment at a plurality of remote parking facilities, a computer-readable medium providing instructions that when implemented by a computer performs a method comprising:*

*receiving parking information from a remote computer at each of the plurality of remote parking facilities, wherein the parking information concerns and identifies a user account authorized to use the system; and*

*generating a single parking fee statement for a user account used at one or more of the plurality of remote parking facilities based on the received parking information.*

*34. The computer readable medium of claim 33 wherein the received parking information includes user account information and wherein a transponder is interrogated to receive the user account information.*

*35. In a system for payment at a plurality of remote parking facilities, a computer-readable medium storing for use by a central computer comprising:*

*user account identification provided to the central computer by a remote computer associated with each remote parking facility;*

*parking data provided to the central computer by the remote computer associated with each remote parking facility, wherein the parking data is for the remote parking facility and associated with user account identifications, and*

*wherein the central computer generates single parking fee statements for user accounts used at one or more of the remote parking facilities based on the vehicle identification and the parking data.*

*36. The computer-readable medium of claim 35, wherein user account identifications are produced based on a vehicle tag transponder and wherein the vehicle tag transponder is interrogated to receive user account information.*

*37. In a system for payment at a plurality of remote parking facilities, a data signal received and for use by a central computer system comprising:*

*user account identifications provided to the central computer by a remote computer associated with each remote parking facility;*

*parking data provided to the central computer by the remote computer associated with each remote parking facility;*

*wherein the parking data corresponds to the remote parking facility and is associated with the user account identifications, and*

*wherein the central computer can generate single parking fee statements for user accounts used at one or more of the remote parking facilities based on the user account identifications and the parking data.*

*38. The received data signal of claim 37, wherein the user account identifications are produced based on a vehicle tag transponder and wherein the vehicle transponder is interrogated to receive user account information.*

*39. In a system for payment at a plurality of remote parking facilities, a data signal transmitted to and for use by a central computer system comprising:*

*user account identifications provided to the central computer by a remote computer associated with each remote parking facility;*

*parking data provided to the central computer by the remote computer associated with each remote parking facility;*

*wherein the parking data corresponds to the remote parking facilities and is associated with the user account identifications, and*

*wherein the central computer can generate single parking fee statements for user accounts used at one or more of the remote parking facilities based on the user account identification and the parking data.*

*40. The transmitted data signal of claim 39, wherein the user account identifications are produced based on a vehicle tag transponder and wherein the vehicle tag transponder is interrogated to receive user account information.*

*41. A method for payment at a plurality of remote parking facilities, comprising the steps of:*

*reading a vehicle's tag identification;*

*charging a parking fee to an account associated with the tag; and*

*transmitting a transaction record corresponding to the charging of the fee to a central computer for generation of a single parking fee statement, based on one or more accounts used at one or more of the remote parking facilities.*

*42. The method of claim 41, further comprising:*

*determining that the tag is valid by comparing the read tag identification with a list of valid tags stored in a first computer corresponding to a first parking facility.*

*43. The method of claim 41, wherein the generation of a parking fee statement comprises including said parking fee.*

*44. The method of claim 41, wherein the generation of a parking fee statement comprises including in the single parking fee statement said parking fee and other parking fees charged to said tag when validated from any remote parking facility of the plurality of parking facilities.*

*45. The method of claim 41, wherein the tag is read when the vehicle approaches an exit of a first remote parking facility.*

*46. A method for payment at a plurality of remote parking facilities comprising the steps of:*

*receiving a first transaction record corresponding to a first parking fee charged to a user account at a first remote parking facility;*

*receiving a second transaction record corresponding to a second parking fee charged to the user account at a second remote parking facility; and*

*generating a single fee statement by including in the statement the first and second parking fees charged to the user account.*

*47. The method of claim 46, wherein the first and second remote parking facilities are one and the same.*

*48. A system for payment at a plurality of remote parking facilities, comprising:*

*a central computer in a central facility;*

*a first computer in a first parking facility for storing and communicating information about a user account to the central computer; and*

*a second computer in a second parking facility for storing and communicating information about said user account to the central computer;*

*wherein the central computer generates a single parking fee statement for said user account and advises the first*

*and second computers of the total fees due to the first and second remote facilities for each user account using the facilities.*

*49. A method for payment at a plurality of remote parking facilities, comprising:*

*receiving user account transaction records from the plurality of remote facilities; and*

*generating single fee statements for user accounts based on the transaction records.*

*50. The method of claim 49, further comprising:*

*sending to each user having a user account a single fee statement with the transaction records associated with that user account.*

*51. The system of claim 1, wherein during specified periods said second computer advises each remote parking facility first computer of the total fees due by user accounts to that remote facility.*

*52. A system for payment at a plurality of remote parking facilities, comprising:*

*a central computer in a central facility;*

*a first computer in a first parking facility for storing and communicating information about a user account to the central computer; and*

*a second computer in a second parking facility for storing and communicating information about said user account to the central computer;*

*wherein the central computer generates a single parking fee statement for said user account.*

*53. An automated vehicle parking system for access and revenue control of a plurality of remote parking facilities, each facility having controlled entrance lanes and controlled exit lanes, the system including:*

*vehicle detection device with each of the remote parking facilities for detecting a vehicle as the vehicle approaches the controlled entrance lane;*

*lane controller system with each of the remote parking facilities coupled to the vehicle detection device for identifying the vehicle and generating a recognition signal;*

*computer database with each of the remote parking facilities for storing parking information concerning all vehicles that use the automated vehicle parking system;*

*first computer associated with each of the remote parking facilities and coupled to the lane controller and the computer database for receiving the recognition signal and generating appropriate parking response signals from the computer database to the lane controller system, said first computer calculating a parking fee for each vehicle;*

*central facility; and*

*communication system including a second computer in said central facility coupled to the first computer to enable the second computer to communicate with said first computer at each of the remote parking facilities and to periodically calculate a single parking fee statement for a given vehicle whether parked at one or more of the plurality of remote parking facilities and to advise each remote facility first computer of the total fees due to that remote facility for each vehicle during specified periods.*

*54. An automated vehicle parking system as in claim 53 wherein the vehicle detection device at each remote parking facility includes a magnetic loop detector that detects an approaching vehicle and identifies a lane number of the vehicle.*

*55. An automated vehicle parking system as in claim 53 wherein the lane controller system at each remote parking facility includes:*

*sensor for transmitting an interrogation signal to the approaching vehicle;*

*tag associated with the vehicle for receiving the transmitted signal and returning a vehicle identification signal to the sensor; and*

*lane controller processor coupled to the sensor and the vehicle detection device, said lane controller processor activating the sensor upon receipt of a signal representing a detected vehicle, receiving a vehicle identification number from the sensor, and passing a valid vehicle identification number, a lane number, and a time of day to the first computer.*

*56. An automated parking system as in claim 55 wherein the computer database at each remote parking facility includes data representing:*

*status of each vehicle tag identification number;*

*rate schedule for each vehicle tag identification;*

*entrance time and date;*

*exit time and date;*

*parking duration interval;*

*maximum and minimum parking duration intervals;*

*parking facility identification; and*

*home parking facility identification.*

*57. An automated vehicle parking system as in claim 56 further comprising an accounting module associated with each of the remote parking facilities and coupled to the first computer and computer database, the accounting module including:*

*an accounts receivable submodule for each of the vehicle tags for storing costs and generating periodic billing statements for parking of each identified vehicle;*

*a rates definition table submodule for defining parameters for a rate calculation algorithm including parking rates for each identified vehicle; and*

*a rate calculation submodule identifying rate schedules for a transponder account associated with each vehicle and calculating costs with the rate calculation algorithm based upon appropriate rates and parking times.*

*58. An automated vehicle parking system as in claim 57 further including:*

*a data report module at each remote parking facility for generating reports showing parking activity by time of day, length of stay, and cost;*

*a customer maintenance file at each remote parking facility including address, billing information, and vehicle information; and*

*a parking administration submodule at each remote parking facility for transmitting appropriate parking response signals to modules in the lane controller system for deactivating lanes, displaying cost, and printing invoices.*

*59. An automated vehicle parking system as in claim 53 wherein said second computer credits each remote parking facility with appropriate fees for parker use thereof.*

*60. An automated vehicle parking system as in claim 53 wherein said second computer advises each remote parking facility of a share of fees due from individual users.*

*61. An automated vehicle parking system including a plurality of remote parking facilities each of which has an entrance and an exit, the system including:*

*a vehicle detector at each remote parking facility for generating a detector signal when a vehicle approaches the entrance to the remote parking facility;*

*a lane controller coupled to the detector at each remote parking facility for receiving the detector signal and generating an identification request signal;*

*a sensor at the entrance of each remote parking facility and coupled to the lane controller for transmitting the identification request signal as an RF signal to the vehicle;*

*a transponder in the vehicle for responding to the transmitted identification request signal by returning an identification code to the sensor;*

*said lane controller receiving the identification code from the sensor, generating a time of day, and a signal representing the lane number;*

*a first computer at each remote parking facility that is coupled to the lane controller for receiving the identification code, the time of day, and lane number and generating an appropriate response to the lane controller, the lane controller automatically admitting the vehicle to the parking facility, or denying the vehicle admittance in accordance with the response from the first computer, said first computer calculating a parking fee for each vehicle using the facility; and*

*a second centralized computer coupled to the first computer at each of the remote parking facilities for communicating with each of the first computers and preparing a single periodic parking fee statement for each vehicle that uses one or more of the remote parking facilities.*

*62. An automatic vehicle parking system as in claim 61 wherein said second computer credits each remote parking facility with appropriate fees for parker use thereof.*

*63. An automatic vehicle parking system as in claim 61 wherein said second computer advises each remote parking facility of a share of fees due from individual users.*

*64. A method for access and revenue control of a plurality of remote parking facilities, each having at least one controlled entrance lane and at least one controlled exit lane, the method comprising the steps of:*

*generating a vehicle detection signal at each of the plurality of remote parking facilities with a detection device when a vehicle approaches a remote parking facility entrance;*

*identifying vehicles authorized to use the remote parking facility with a lane controller system and generating an authorization signal;*

*storing parking information in a database of a first computer concerning the vehicles authorized to use the remote parking facility;*

*generating appropriate parking responses to the lane controller system upon receiving the authorization signal; and*

*communicating with the database of the first computer in each of the remote parking facilities with a central computer and compiling a single parking fee statement with the central computer for a user of one or more of the remote parking facilities.*

*65. The method as in claim 64 further comprising the step of detecting an approaching vehicle at each of the remote parking facilities and identifying a lane number of the vehicle with a magnetic loop detector.*

*66. The method as in claim 65 further comprising the steps of:*

*coupling a sensor to a vehicle detection system for transmitting an interrogation signal to the approaching vehicle;*

*associating a transponder with the vehicle for receiving the transmitted signal and returning a vehicle identification signal to the sensor; and*

*storing data representing current vehicle transponder identification signals and time of day in a lane controller processor and passing a vehicle identification number, the lane number, and a time of day to the first computer.*

*67. The method as in claim 66 further comprising the step of using said central computer to advise each remote facility computer of total fees due the corresponding remote facility for all users of the respective remote facility during specified periods.*

* * * * *